(12) United States Patent
Hovi et al.

(10) Patent No.: US 9,213,473 B2
(45) Date of Patent: Dec. 15, 2015

(54) DEVICE AND SYSTEM FOR ELEVATOR MAINTENANCE

(71) Applicant: KONE Corporation, Helsinki (FI)

(72) Inventors: Antti Hovi, Hyvinkää (FI); Ari Kattainen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 399 days.

(21) Appl. No.: 13/889,912

(22) Filed: May 8, 2013

(65) Prior Publication Data

US 2013/0246928 A1      Sep. 19, 2013

Related U.S. Application Data

(63) Continuation of application No. PCT/FI2011/050954, filed on Oct. 31, 2011.

(30) Foreign Application Priority Data

Nov. 9, 2010   (FI) ...................................... 20106177

(51) Int. Cl.
*G06F 3/0484* (2013.01)
*B66B 5/00* (2006.01)

(52) U.S. Cl.
CPC ............ *G06F 3/0484* (2013.01); *B66B 5/0025* (2013.01)

(58) Field of Classification Search
CPC ........................... G06F 3/0484; B66B 5/0025
See application file for complete search history.

(56) References Cited

U.S. PATENT DOCUMENTS

| | | | |
|---|---|---|---|
| 6,304,257 B1 * | 10/2001 | Viskari | 715/764 |
| 2002/0138327 A1 | 9/2002 | Mello et al. | |
| 2003/0051062 A1 * | 3/2003 | Circenis | 709/310 |
| 2003/0102190 A1 * | 6/2003 | Newville et al. | 187/391 |
| 2006/0144646 A1 | 7/2006 | Engel et al. | |
| 2007/0151809 A1 * | 7/2007 | Tyni et al. | 187/391 |
| 2011/0040793 A1 * | 2/2011 | Davidson et al. | 707/784 |
| 2011/0295551 A1 * | 12/2011 | Rasanen et al. | 702/150 |

FOREIGN PATENT DOCUMENTS

| | | |
|---|---|---|
| CN | 101419442 A | 4/2009 |
| JP | 2007-137654 A | 6/2007 |
| JP | 2007-254035 A | 10/2007 |
| JP | 2009-286602 A | 10/2009 |
| WO | WO 2008/072023 A1 | 6/2008 |

\* cited by examiner

*Primary Examiner* — Anil Bhargava
(74) *Attorney, Agent, or Firm* — Birch, Stewart, Kolasch & Birch, LLP

(57) ABSTRACT

The invention concerns a portable user interface and a system utilizing the user interface for the collection and processing of information relating to elevator maintenance. Said user interface comprises means for transferring information between the user interface and an elevator control unit and between the user interface and an elevator maintenance database server.

13 Claims, 2 Drawing Sheets

DEVICE AND SYSTEM FOR ELEVATOR MAINTENANCE

CROSS REFERENCE TO RELATED APPLICATIONS

This application is a Continuation of PCT International Application No. PCT/FI2011/050954 filed on Oct. 31, 2011, which claims priority under 35 U.S.C. §119(a) to Patent Application No. 20106177 filed in Finland on Nov. 9, 2010, all of which are hereby expressly incorporated by reference into the present application.

FIELD OF THE INVENTION

The invention concerns devices and systems for the collection and processing of information relating to elevator maintenance.

DESCRIPTION OF PRIOR ART

For the execution of elevator maintenance and installation work, it is a prerequisite that the elevator can be operated even in connection with certain failure situations in the elevator system. In addition, it would be necessary to obtain some sort of indication of the cause of a fault, such as a control system fault, manifesting itself in the elevator. For this reason, elevators are generally provided with a so-called maintenance interface, which is usually placed in a control panel e.g. in the machine room or at the entrance into the elevator shaft. The maintenance interface is only used in connection with maintenance and installation work, but otherwise the interface is locked and/or inaccessible so that improper use of the interface is prevented.

Elevator monitoring and control systems have grown more versatile and at the same time also more intricate as a result of reasons including improved microprocessor performance and an increased amount of information to be processed. Consequently, fault analysis of the systems has also become more challenging. Due to the increased complexity of the systems, fault analysis tends to be protracted, which hampers elevator operation while also increasing the maintenance and installation costs.

For the safety of installation/maintenance work, it is also important that the installation/maintenance instructions should be free of errors and that the instructions should be up-to-date in other respects, too. Moreover, the instructions should be sufficiently accurate and it should be possible to apply them in each working situation according to the needs and requirements.

OBJECT OF THE INVENTION

The object of the invention is to disclose an improved user interface that is safer and more functional than earlier solutions, as well as a system utilizing the user interface for the collection and processing of information relating to the maintenance of elevators. To achieve this object, a user interface according to claim 1 and a system according to claim 16 are disclosed in the present invention. Preferred embodiments of the invention are described in the sub-claims. Inventive implementations and inventive combinations of different implementations are also presented in the description part of the application and in the drawings.

BRIEF DESCRIPTION OF THE INVENTION

The portable user interface of the invention for the collection and processing of information relating to elevator maintenance comprises means for transmitting information between the user interface and an elevator control unit and, on the other hand, between the user interface and an elevator maintenance database server. Thus, the user interface can be used to collect and process both information relating to elevator installation/maintenance stored on the server and, on the other hand, also information relating to the behavior of the elevator obtained from the elevator control unit. Therefore, the information stored on the server can also be utilized in the installation/maintenance of elevators and in fault diagnosis.

In a preferred embodiment of the invention, the user interface comprises a communication circuit, via which the user interface can be connected to the elevator control unit in a manner permitting data transfer. The communication circuit preferably communicates with the data processor of the user interface, so that data can be transferred between the processor and the elevator control unit and, via the elevator control unit, possibly further between the processor and the maintenance database.

In a preferred embodiment of the invention, the user interface comprises means for measuring the remaining operating time of the user interface. When the operating time is exhausted, the user interface will stop working, so this solution makes it possible to prevent in a simple and reliable manner unauthorized utilization of the user interface, e.g. if the user interface has fallen into the hands of a person not entitled to its use. In an embodiment of the invention, the means for measuring the remaining operating time of the user interface comprise a real-time clock for measuring the lapse of time. In an embodiment of the invention, the real-time clock is arranged to be supplied with electricity from a battery/accumulator, allowing the lapse of operating time to be measured uninterruptedly within the limits determined by the capacity of the battery/accumulator.

The user interface preferably comprises a processor and, communicating with the processor, a memory storage, where the software to be executed is stored. In a preferred embodiment of the invention, the processor is arranged to execute a program for increasing the operating time of the user interface on the basis of an action performed by the maintenance database server, permitting the operating time to be increased. Thus, more operating time can be released for the user interface on the basis of the action performed by the maintenance database server e.g. in such manner that an identification code shown on the user interface display is entered in the maintenance database server into the software managing the operating time, and if the identification code is valid, then the software generates a release code. In a preferred embodiment of the invention, the release code generated by the maintenance database server is entered into the user interface via the user interface keypad; in another embodiment of the invention, the user interface receives the release code from the maintenance database server via the communication circuit. If the release code is valid, then the available operating time of the user interface is increased.

The executable software stored in the memory of the user interface preferably comprises functions and/or parameters relating to the functionality of the user interface. In a preferred embodiment of the invention, the data stored in the memory of the user interface includes a user group data record, which indicates among different user groups that user group to which the utilization of the user interface has been allocated. In the software to be executed, the aforesaid user group data record is associated with one or more functions and/or parameters in such a way that one or some of the said functions and/or parameters are only available for use by a subset of the aforesaid different user groups. In an embodiment of the invention, the choice of functions and/or parameters assigned for use by a user group may also differ from the choice of functions and/or parameters assigned for use by one or more other user groups. Thus, the functionality of the user interface can be adapted based on the selected user group in such manner that that e.g. the number of available control and testing functions varies from one user group to another; in addition, e.g. certain testing parameters or the fault history collected from the elevator control unit into the user interface may only be available for use by a subset of the different user groups. A possible user group is a group consisting of investigation and product development specialists, which may have a larger choice of different functions and parameters available for use than any other user group; another possible user group is a group consisting of maintenance technicians, for whom the choice of available functions/parameters may also differ from the choice of functions/parameters available to one or more other user groups; a third possible user group is a group consisting of fault diagnosis personnel, for whom the choice of available functions/parameters may also differ from the choice of functions/parameters available to one or more other user groups. In addition to or in difference from what was stated above, the user groups can also be divided e.g. in such a way that persons working for the service provider managing the user interface form one or more different user groups than persons working for external service companies and similar outside service providers. In an embodiment of the invention, portable user interfaces allocated for utilization by persons working for the elevator manufacturer managing the user interface are applicable for use with all elevators made by the elevator manufacturer, whereas the elevator manufacturer's portable user interfaces allocated for utilization by external service companies and similar outside service providers are only applicable for use with certain elevators predetermined by contract. In addition to or in difference from this, the user groups can also be selected geographically using an area code system, thus allowing e.g. the language of the text displayed on the user interface to be localized so that the text is always displayed in the local language.

In an embodiment of the invention, the operating time of the user interface is determined on the basis of the user group data record. Thus, a user interface allocated for utilization by a given first user group may run out of operating time earlier and therefore stop working sooner than a user interface allocated for utilization by another user group. When more operating time is released, the operating time for the user interface of the said first user group is thus not increased as much as the operating time for the user interface of the second user group.

In an embodiment, the aforesaid user interface processor is arranged to execute a program for sending a control signal containing the user group data record to the elevator control unit.

In an embodiment of the invention, an identification for identifying the user interface is stored in the memory of the user interface, and the processor is arranged to execute a program for generating a control message containing the identification for the maintenance database server.

In a preferred embodiment of the invention, the user interface memory comprises a memory area reserved for the storage of information received via the communication circuit of the user interface. The aforesaid memory area reserved for information received via the communication circuit is preferably located in a memory circuit removable from the user interface, such as an SD memory card. In this case the user interface also comprises a connection slot for an SD memory card.

In a preferred embodiment of the invention, the user interface comprises a display, and the user interface processor communicates with the said display and with the aforesaid memory area reserved for the storage of information received via the communication circuit. The processor is arranged to execute a program for presenting the information received via the communication circuit on the user interface display.

In an embodiment of the invention, the user group data record is linked in the user interface software to the aforesaid program to be executed to present the information received via the communication circuit in such a way that execution of the program is only allowed to a subset of the different user groups.

In a preferred embodiment of the invention, the user interface comprises one or more manually actuatable keys connected with the user interface processor, so that the said one or more keys can be used to generate a message to be processed by the processor. In an implementation, the said keys can also be used to issue an operating command to operate the elevator at a limited speed in connection with a failure situation, a maintenance situation or some other activity deviating from normal operation of the elevator.

The system of the invention for the collection and processing of information relating to elevator maintenance comprises a maintenance database, a server for the utilization of the maintenance database, an elevator control unit and a portable user interface like one of those described above. The elevator control unit is provided with a communication circuit for setting up a data transfer connection between the elevator control unit and the user interface. The elevator control unit comprises a processor and a memory, wherein the software to be executed is stored. The said processor communicates with the said memory and communication circuit in the elevator control unit, and the processor of the elevator control unit is arranged to activate a function for testing the elevator and/or processing information relating to maintenance on the basis of a control signal received from the user interface. The system of the invention makes it possible to utilize the user interface for the collection and processing of information relating to the installation/maintenance of elevators stored on the server and, on the other hand, also of information relating to the behavior of the elevator obtained from the elevator control unit. In the system of the invention, the information stored on the server can also be utilized in elevator installation/maintenance work and in fault diagnosis. Furthermore, the user interface can be used in the system to activate various elevator testing functions, and information obtained as a result of the testing functions can be further collected and processed with the user interface.

In a preferred embodiment of the invention, the user group data record received from the user interface is linked in the software of the elevator control unit with one or more functions and/or parameters in such a way that one or some of the said functions and/or parameters are only available to a subset of the different user groups utilizing the user interface. Thus, when the elevator control unit is operated by means of a portable user interface, the functionality of the elevator control unit can be modified on the basis of the user group selected in the user interface so that e.g. the number of available control and testing functions varies depending on the user group.

In a preferred embodiment of the invention, a data transfer connection is established between the elevator control unit and the maintenance database server, and the processor of the elevator control unit is arranged to execute a program for transmitting the information received from the maintenance database server to the user interface. Thus, the user interface can for example receive from the maintenance database server instructions for fault diagnosis and testing during elevator maintenance work. The information stored in the maintenance database may also include a fault diagnosis tree containing fault diagnosis instructions/suggestions for reparative action indexed so as to form a tree-like branched search list structure on the basis of a failure message received from the elevator control unit.

In an embodiment of the invention, the portable user interface has a fault diagnosis tree stored in its memory, in which fault diagnosis instructions/suggestions for reparative action are indexed so as to form a tree-like branched search list structure on the basis of a failure message received from the elevator control unit.

In an embodiment of the invention, the said fault diagnosis tree or at least part of it is loaded from the maintenance database into the user interface memory.

In the invention, information relating to elevator maintenance refers to information relating to elevator installation and maintenance activities.

In addition to elevator systems, the invention is also applicable for use in the installation/maintenance of e.g. escalator and moving walkway systems.

The foregoing summary, as well as the additional features and advantages presented below, will be better understood from the following description of embodiments non-restrictive of the scope of application of the invention.

DETAILED DESCRIPTION OF PREFERRED EMBODIMENTS OF THE INVENTION

Figure 1:
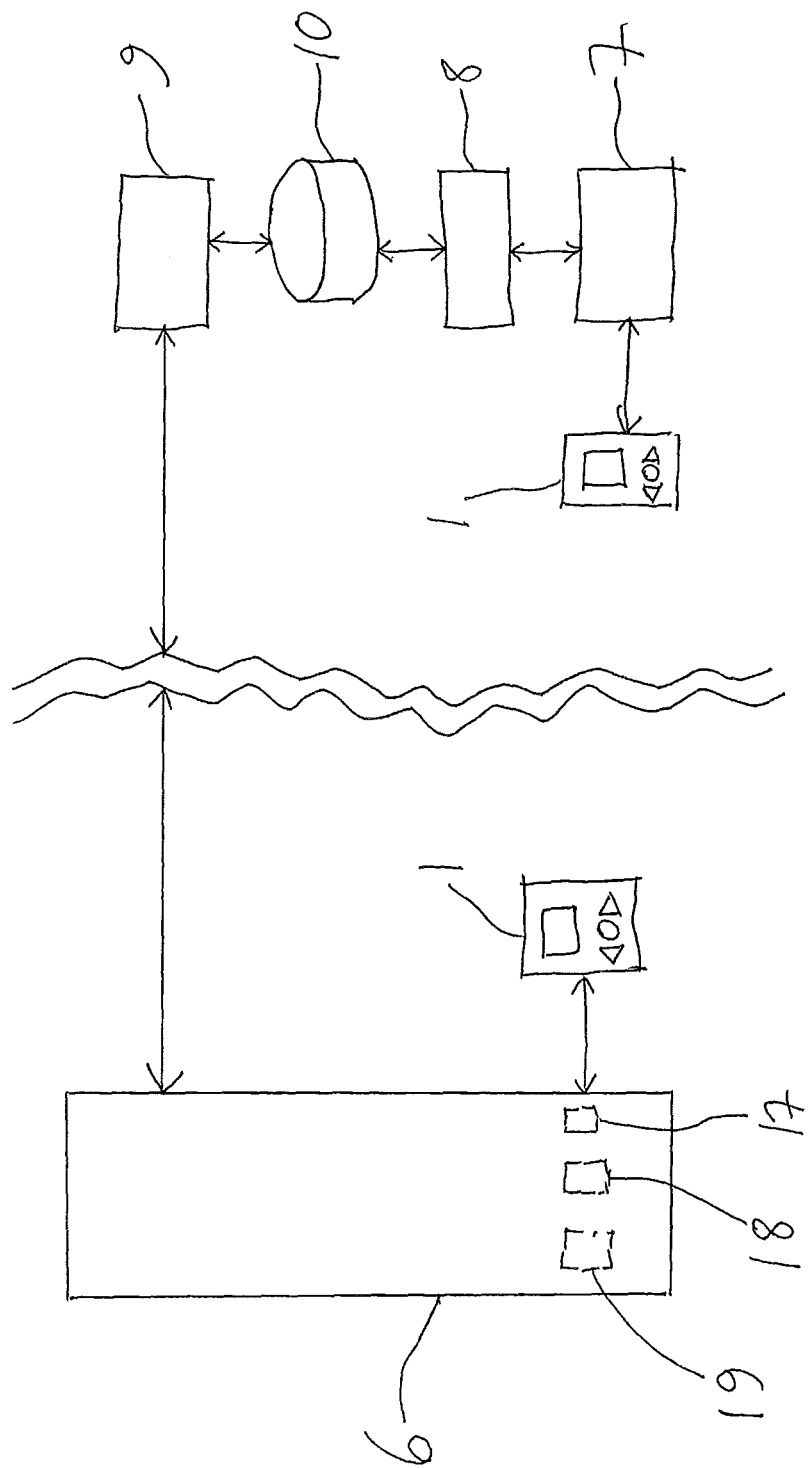
FIG. 1 is a block diagram representing a system according to the invention for the collection and processing of information relating to elevator maintenance.

FIG. 1 is a block diagram representing a system for the collection and processing of information relating to elevator maintenance. In the system, the elevator control unit 6 communicates with the server 9 of the maintenance database 10 over a data transfer connection, such as an internet connection or a wireless connection, e.g. a GSM connection. The elevator control unit 6 transmits to the maintenance database server 9 information relating to the maintenance of the elevator, such as information about the degree of utilization of the elevator, and information regarding possible elevator failure situations detected or other functional deviations, such as electric power failures. In addition, the aforesaid data transfer connection can also be used for the transmission of e.g. emergency data, such as an alarm message generated by a passenger trapped in an elevator car, from the elevator to a maintenance center.

The aforesaid elevator control unit 6 may be e.g. a monitoring unit mounted in conjunction with the elevator car or e.g. an elevator car movement-controlling unit equipped to control elevator car movement in the elevator shaft during normal operation of the elevator. The elevator car movement-controlling unit receives elevator calls, which are issued by elevator passengers on different floors or using the call input devices in the elevator car, and, based on the elevator calls, generates a target value for elevator car movement, i.e. a speed reference, according to which the elevator car is to be moved in the elevator shaft. If the elevator system comprises several elevator cars/elevators, then the aforesaid elevator control unit 6 may be an elevator group control unit. The group control unit receives elevator calls of different elevators from call input devices and allocates each call to a given elevator to serve it, with an aim to optimize the operation of the elevator system, e.g. to shorten the elevator waiting time, reduce energy consumption of the elevator, etc.

Figure 2:
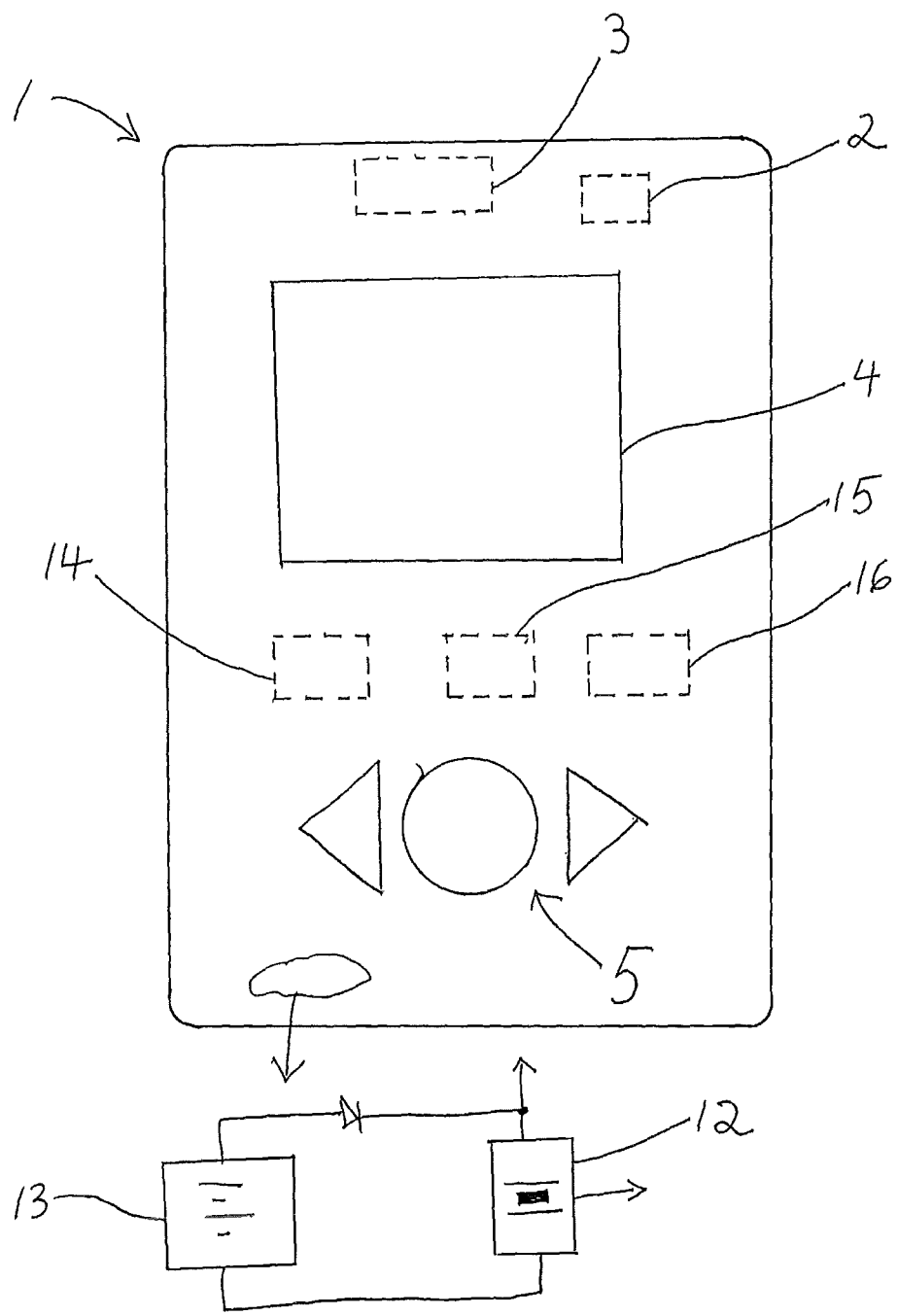
FIG. 2 visualizes a portable user interface according to the invention.

The system according to FIG. 1 additionally comprises a portable user interface 1 for the collection and processing of information relating to elevator maintenance. FIG. 2 shows a more detailed visualization of a possible portable user interface 1 applicable e.g. in the system of FIG. 1. The user interface 1 has a connector 3, through which the user interface 1 is connected to the elevator control unit 6 by pressing the user interface 1 into contact with the counter piece of the connector on the elevator control unit 6 or by connecting the user interface 1 and the elevator control unit 6 by means of a signal cable. Moreover, the user interface is provided with a transmitter/receiver circuit 2, which is connected to a microcontroller 14 in the user interface 1 so that the microcontroller 14 can be used to send/receive messages to/from the elevator control unit 6. The software of the user interface 1 is stored in the internal memory 15 of the microcontroller. In addition, the user interface 1 has a slot for an SD memory card 16, which can be used to load software updates into the user interface; it is also possible to store on the SD memory card information relating to elevator start-up/maintenance, such as fault parameters received from the elevator control unit. In an embodiment of the invention, it is also possible to load onto the SD memory card e.g. instructions and directions relating to installation/maintenance transmitted by the elevator control unit 6 from the maintenance database server 9. The loading of instructions and directions can be effected over the data transfer connection between the elevator control unit 6 and the maintenance database server 9 in such manner that the elevator control unit 6 transmits information received from the maintenance database server 9 further to the user interface 1. The processor 14 of the user interface 1 is connected to the data bus of the SD memory card and also to the display 4 of the user interface 1 so that instructions stored on the SD memory card relating to e.g. installation/maintenance can be presented on the user interface display 4 e.g. in text form. In an embodiment of the invention, the information loaded onto the SD memory card includes a so-called fault diagnosis tree, which contains fault diagnosis instructions/suggestions for reparative action indexed on the basis of the failure history of the elevator, received from the elevator control unit 6, so as to form a tree-like branched search list such that the fault diagnosing process proceeds step by step starting from the trunk of the tree towards the tip of the branches.

When the user interface 1 of FIG. 2 is taken in use, the user interface 1 is allocated to a given user group. In the user interface software, different parameters/functions are associated with an additional attribute which determines whether the parameter/function associated with the attribute is in use in the user group to which the user interface 1 in question has been allocated. If the attribute and the user group allocated for the user interface do not coincide, then the use of the parameter/function associated with the attribute in question is prevented. For example, the fault diagnosis tree shown to the fault diagnosis user group is not necessarily visible to the elevator installers user group; on the other hand, the elevator installers user group may have access to installation instructions that are not necessary to the fault diagnosis user group. Moreover, utilization of the fault diagnosis tree may be restricted in the user group consisting of external maintenance companies and similar external service providers; also, such groups do not necessarily have access to the maintenance database of the elevator company managing the utilization of the user interface 1.

The user interface 1 of FIG. 2 comprises means 12, 13 for measuring the remaining operating time of the user interface 1. When the user interface is taken in use, the user interface memory contains a certain amount of available operating time, which is gradually consumed down to nil, whereupon the user interface stops working. Therefore, it is necessary to release more operating time at predetermined intervals. In an embodiment of the invention, the said predetermined interval for release of operating time is 1 month; in another embodiment of the invention, the said predetermined interval is 6 months. The predetermined interval may also vary between user groups, for example so that the predetermined interval for e.g. the investigation and product development specialists user group, which may also have access to the largest choice of parameters/functions, may be shorter than for some other user group.

The user interface 1 comprises a real-time clock 12, which is arranged to be supplied with electric power from a battery 13 in a situation where the user interface is disconnected from the elevator control unit 6. This solution allows continuous and reliable measurement of operating time. The microcontroller 14 of the user interface reads the date/time indicated by the real-time clock 12 and compares it to the instant of time stored in the memory. When the date/time indicated by the real-time clock reaches the said instant of time stored in the memory, the microcontroller 14 will set the execution of the software of the user interface 1 into a state where operation of the user interface relating to collection and processing of maintenance data is disabled. After this, said operation of the user interface 1 remains disabled until more operating time is released for the user interface 1. The release of operating time is effected by inputting the identification code shown on the display 4 of the user interface 1 to the server 7 of the maintenance database 10 e.g. using the keypad, whereupon the server 7 compares the identification code thus entered to existing codes using data search software 8, and if the code is correct then the server 7 will generate a release code, which is entered into the user interface 1 via the user interface keypad 5. If the release code entered is valid, then the available operating time of the user interface is increased. In connection with the comparison, the server 7 also checks the user group allocated for the user interface 1, and if the user group has changed, then the server 7 incorporates corresponding information in the release code, so when the release code is entered into the user interface 1, the user group of the user interface 1 is also changed so as to make it correspond to the information contained in the maintenance database 10.

In an embodiment of the invention, the portable user interface 1 can also be used to start and/or control testing processes, which are employed to search for failure data/information about the functioning of the elevator system, using a predetermined control sequence. The aforesaid testing process start/control commands are input from the user interface 1 to the communication circuit 17 of the elevator control unit 6 via the communication circuit 2 of the user interface 1. In connection with the start/control commands, the elevator control unit 6 is also sent data indicating the user group to which the user interface in question is allocated. The elevator control unit comprises a microprocessor 18 and a memory 19, where the software executable by the elevator control unit 6 is stored. In the software of the elevator control unit 6, certain functions are associated with an additional attribute, which determines whether the function associated with the attribute is in use in the user group to which the user interface 1 in question has been allocated. If the attribute and the user group allocated for the user interface do not coincide, then the use of the function associated with the attribute in question is disabled.

In an embodiment of the invention, it is also possible to give from outside the elevator shaft a control command via the user interface 1 to operate the elevator in a rescuing situation at a limited rescue operation speed. In another embodiment of the invention, it is possible to give from the elevator shaft a control command via the user interface to operate the elevator in a maintenance situation at a limited maintenance operation speed.

In an embodiment of the invention, the communication circuit 2 comprised in the user interface 1 is arranged to establish a wireless data transfer connection between the user interface 1 and the elevator control unit 6 when the user interface 1 is brought into the vicinity of the elevator control unit 6. The wireless data transfer connection may be implemented as a Bluetooth connection or a corresponding wireless data transfer connection known in itself; in this case, in addition to the user interface 1, the elevator control unit 6 is likewise equipped with a communication circuit 17 enabling communication via the wireless data transfer connection selected for use.

The invention has been described above by referring to a few embodiment examples. It is obvious to a person skilled in the art that the invention is not exclusively limited to the examples described above, but that many other embodiments are possible within the scope of the inventive idea defined in the claims.

The invention claimed is:

1. A portable user interface for collecting and processing information relating to elevator maintenance, the portable user interface comprising:
   a real-time clock for indicating a current time;
   a display;
   means for transmitting information between the portable user interface and an elevator control unit and between the portable user interface and an elevator maintenance database server; and
   a communication circuit for transmitting a control signal to the elevator control unit to start a function for testing the elevator and/or processing information relating to maintenance on the basis of the control signal, wherein available operating time of the portable user interface for testing the elevator and/or processing information relating to maintenance is assigned a predefined time limit determined on the basis of a user group data record, and the portable user interface further comprises a processor configured to
      disable operation of the portable user interface when the available operating time indicated by the real-time clock reaches the predefined time, and
      execute a program for increasing the available operating time of the portable user interface by inputting an identification code in the portable user interface, receiving a release code generated by the elevator maintenance database server, and verifying the release code entered on the portable user interface.

2. The portable user interface according to claim 1, further comprising a memory, which communicates with the processor and in which software to be executed is stored.

3. The portable user interface according to claim 2, wherein the software to be executed comprises functions and/or parameters relating to the functionality of the portable user interface;

that the user group data record is stored in the memory and indicates, from among different user groups, that user group to which the utilization of the user interface has been allocated; and that the user group data record is associated, in the software to be executed, with one or more functions and/or parameters so that one or more of said functions and/or parameters are only available for use by a subset of said different user groups.

4. The portable user interface according to claim 1, wherein the processor is arranged to execute another program for sending a control signal containing the user group data record to the elevator control unit.

5. The portable user interface according to claim 2, wherein an identification for identifying the portable user interface is stored in the memory of the portable user interface, and the processor is arranged to execute a program for generating a control message containing the identification for the maintenance database server.

6. The portable user interface according to claim 1, further comprising:
   a memory area reserved for the storage of information received via the communication circuit.

7. The portable user interface according to claim 6, wherein the memory area reserved for information received via the communication circuit is located in a memory circuit removable from the user interface.

8. The portable user interface according to claim 6 or 6, wherein
   the portable user interface processor communicates with the display and with the memory area reserved for the storage of information received via the communication circuit; and
   the processor is arranged to execute the program for presenting the information received via the communication circuit on the display.

9. The portable user interface according to claim 8, wherein the user group data record is linked in the software of the portable user interface to said program to be executed to present the information received via the communication circuit on the user interface display, so that execution of the program is only allowed to a subset of the different user groups.

10. A portable user interface according to claim 1, further comprising:
    one or more manually actuatable keys for generating a message to be processed by the processor.

11. A system for collecting and processing information relating to elevator maintenance, comprising:
    a maintenance database;
    a server for utilizing the maintenance database;
    an elevator control unit; and
    a portable user interface, wherein
    available operating time of the portable user interface for testing the elevator and/or processing information relating to maintenance is assigned a predefined time limit determined on the basis of a user group data record, and
    the portable user interface further comprises a processor configured to
        disable operation of the portable user interface when the available operating time indicated by the real-time clock reaches the predefined time, and
        execute a program for increasing the available operating time of the portable user interface by inputting an identification code in the portable user interface, receiving a release code generated by the elevator maintenance database server, and verifying the release code entered on the portable user interface; and
    the elevator control unit includes
        a processor,
        a memory, and
        a communication circuit for establishing a data transfer connection between the elevator control unit and the portable user interface; and
    the elevator control unit is arranged to start a function for testing the elevator and/or processing information relating to maintenance on the basis of a control signal received from the portable user interface.

12. The system according to claim 11, wherein
    the memory includes a user group data record stored therein, which indicates, from among different user groups, that user group to which utilization of the portable user interface has been allocated; and
    the user group data record is linked in the software of the elevator control unit to one or more functions and/or parameters, so that one or some of the said functions and/or parameters are only available to a subset of the different user groups using the user interface.

13. The system according to claim 11 or 12, wherein a data transfer connection is established between the elevator control unit and the maintenance database server;
    and that the processor of the elevator control unit is arranged to execute the program for transmitting the information sent by the maintenance database server to the portable user interface.

* * * * *